(12) United States Patent
Semar et al.

(10) Patent No.: US 8,917,219 B2
(45) Date of Patent: Dec. 23, 2014

(54) RFID TRANSPONDER ANTENNA

(75) Inventors: Robert Semar, Dresden (DE); Michael Schaefer, Burghardswalde (DE); Marco Wagner, Dresden (DE); Henry Prescher, Dresden (DE)

(73) Assignee: Smartrac Technology Dresden GmbH, Dresden (DE)

( * ) Notice: Subject to any disclaimer, the term of this patent is extended or adjusted under 35 U.S.C. 154(b) by 943 days.

(21) Appl. No.: 13/120,726

(22) PCT Filed: Sep. 25, 2009

(86) PCT No.: PCT/EP2009/062463
§ 371 (c)(1),
(2), (4) Date: Jun. 6, 2011

(87) PCT Pub. No.: WO2010/034820
PCT Pub. Date: Apr. 1, 2010

(65) Prior Publication Data
US 2011/0267254 A1    Nov. 3, 2011

(30) Foreign Application Priority Data

Sep. 25, 2008    (DE) .......................... 10 2008 048 948

(51) Int. Cl.
*H01Q 7/00*     (2006.01)
*H01Q 1/22*     (2006.01)
*G06K 19/077*   (2006.01)

(52) U.S. Cl.
CPC ........ *H01Q 1/2225* (2013.01); *G06K 19/07749* (2013.01); *G06K 19/07752* (2013.01); *G06K 19/07779* (2013.01); *G06K 19/07783* (2013.01)
USPC ........... 343/866; 343/867; 343/868; 343/869; 343/870

(58) Field of Classification Search
USPC .................................. 343/866–870
See application file for complete search history.

(56) References Cited

U.S. PATENT DOCUMENTS

2003/0016133 A1*  1/2003  Egbert ...................... 340/572.7

FOREIGN PATENT DOCUMENTS

| DE | 19610284 A1 | 8/1997 |
| DE | 19848821 C1 | 5/2000 |
| DE | 19912201 A1 | 8/2000 |
| EP | 1742173 A   | 1/2007 |

OTHER PUBLICATIONS

International Search Report for PCT/EP2009/062463 dated Dec. 15, 2009.
Haghiri Yahya et al; "Vom Plastik zur Chipkarte; 7.2 Kontaktlose Chipkarte," Vom Plastik zur Chipkarte: Wegweiser zum Augbau und Zurherstellung von Chipkarten, Jan. 1, 1999, pp. 181-192.
Notification of Transmittal of translation of the IPER for PCT/EP2009/062463 dated Mar. 29, 2011 (1 pg.).
International Preliminary Report on Patentability in English dated Mar. 29, 2011 (9 pp.) for PCT/EP2009/062463.
* cited by examiner

*Primary Examiner* — Matthew Mikels
(74) *Attorney, Agent, or Firm* — Heslin Rothenberg Farley & Mesiti P.C.

(57) ABSTRACT

An RFID transponder antenna has a carrier substrate and an auxiliary substrate. The carrier substrate is provided with a contact point for a first connection to an integrated circuit, and a first conductor path including at least two coil turns. A first end of the path forms a contact terminal for a second connection to the integrated circuit. The other end forms a connection point for an electrical connection to a second conductor path. The second path on the auxiliary substrate forms a bridge over the coil turns. The second conductor path has one end connected to the contact point, and another end connected to the connection point providing a permanent connection between the auxiliary substrate and/or the first conductor path, and the carrier substrate and/or second conductor path; the permanent connection being formed at least at one point lying between both ends of the auxiliary substrate.

7 Claims, 4 Drawing Sheets

FIG 1 State of the Art

Prior Art

RFID TRANSPONDER ANTENNA

CROSS REFERENCE TO RELATED APPLICATIONS

This application is a national stage filing under section 371 of International Application No. PCT/EP2009/062463 filed on Sep. 25, 2009, and published in German on Apr. 1, 2010 as WO 2010/034820 and claims priority of German application No. 10 2008 048 948.4 filed on Sep. 25, 2008, the entire disclosure of these applications being hereby incorporated herein by reference.

BACKGROUND ART

The invention relates to a transponder antenna, particularly intended for use in RFID (radio frequency identification) transponders. Such devices commonly have an antenna arranged on a carrier substrate or in a housing, as well as an integrated circuit connected to the antenna, said integrated circuit being most commonly present in the form of a semiconductor component. In some cases, a battery is also provided as a power supply.

In principle, either HF or UHF transponders are used, depending on the frequency of data transmission from and to the integrated circuit. When HF transponders are used (so-called loop antennas) particularly flat coil antennas are commonly used.

In the case of such coil antennas, there is always a region in which the conductor path which forms the antenna crosses the turns of the coil formed by said conductor path in order that both ends of the conductor path can be connected to the connectors of the integrated circuit. In order to prevent a short circuit, the segments of the conductor path which cross each other must be electrically insulated from each other. In cases where the antenna is manufactured by forming wire to the desired shape, this can be achieved by using enameled wire, for example.

In the case of antenna structures which are produced by additive methods (e.g. by printing) or by subtractive methods (e.g. by selective etching of a metal layer) on a non-conducting carrier substrate, the antenna is most commonly constructed in two parts.

For example, the coil turns can be arranged on a first side of the carrier substrate along with a bridge which crosses the coil turns, wherein both ends of the bridge are connected in an electrically conducting manner through the carrier substrate, with one end of the conductor path which forms the coil turns on one side, and a contact terminal for the connection to the integrated circuit on the other side. This can be performed, for example, by using vias, or by mechanically connecting the ends, e.g. by stamping. In the case of a mechanical connection (stamping), the non-conducting carrier substrate is punctured, such that the site of the puncture is the site where an electrical contact between the two conductor path structures is created, wherein one said structure is arranged on each side of the carrier substrate.

However, the bridge can also be arranged on the same side of the carrier substrate as the conductor path which forms the coil turns. If the bridge is applied by means of an additive method, it is also important to ensure that the bridge is electrically insulated from the coil turns. This can be achieved by initially overprinting an insulating paste at the point where the bridge will cross the coil turns, then printing a conducting path which forms the bridge.

As an alternative, the bridge can also be produced by using an additional auxiliary substrate. In such a case, a conductor track which will later form the bridge may be attached to the auxiliary substrate by means of, for example, printing with a conductor paste. Next, the auxiliary substrate itself is laid over the carrier substrate in such a manner that the conductor path which forms the bridge crosses the coil turns. Then, one end of the bridge is electrically connected to one end of the conductor path which forms the coil turns, and the other bridge end is electrically connected to a contact terminal which provides a connection to the integrated circuit. This can be done by means of ultrasound welding, for example. In this case as well, a layer of insulation must be inserted between the conductor path on the auxiliary substrate, said conductor path forming the bridge, and the conductor path on the carrier substrate, said conductor path forming the coil turns. This layer of insulation can be produced by printing with an insulating paste, for example. In this case, the insulation layer can either be arranged on the auxiliary substrate or on the carrier substrate before the auxiliary substrate is placed over the carrier substrate. This can be done by printing with an insulating paste, for example.

In the case of the example of RFID transponder antennas provided above, the problem arises that such constructions are not sufficiently flexible for many applications. If such a transponder, the transponder being inserted into a label or a card, is bent significantly, the carrier substrate and the auxiliary substrate are stretched to different degrees. This may result in a disconnection of the bridge, whereby the transponder becomes damaged and therefore unusable. Damage or alteration to the transponder may also occur if its electrical characteristics change as a result of such mechanical loading in such a manner that the insulating bridge is altered in its function of providing capacitance.

Therefore, there is a need for a technical solution for this type of RFID transponders, wherein the solution should improve the mechanical resilience of the antenna with respect to loads that cause bending.

BRIEF SUMMARY OF INVENTION

In order to solve this problem, the invention provides an RFID transponder antenna having a carrier substrate and an auxiliary substrate, wherein a contact point for a first connection to an integrated circuit, and a first conductor path structure which forms at least two coil turns are arranged on the carrier substrate. The first end of said conductor path forms a contact terminal for a second connection point for an electrical connection to a second conductor path. A second conductor path is arranged on the auxiliary substrate, said conductor path forming a bridge over the coil turns. The second conductor path has one end which is electrically connected to the connection point. The invention thereby provides a permanent connection between the auxiliary substrate and/or the second conductor path on the one hand, and the carrier substrate and/or first conductor path on the other hand, said permanent connection being formed at least at one point lying between both ends of the auxiliary substrate.

In the above explanation, the term 'contact point' should be understood to mean a conductive body which provides a contact terminal on one end for the first connection to the integrated circuit and a connection point on the other end for the second conductor path. As such, this term includes both compact material bodies which enable a connection of the integrated circuit and the second conducting path, and also conductor paths having two ends, wherein one serves as a contact terminal for the first connection of the integrated circuit, and the other serves as a connection point for the second conductor path, wherein said second conductor path functions as the bridge. In the case of the latter embodiment, a larger distance between the bridge and the integrated circuit can be achieved than in the first embodiment described above. The chip site is therefore not coupled to the immediate area of the bridge.

Material connections are a type of connection in which both elements participating in the connection are held together by atomic or molecular forces. At the same time, they are permanent connections which can only be broken by destruction of the connection agent itself. They are produced by soldering, welding, gluing, vulcanizing, or other means, for example.

The RFID transponder antenna according to the invention is characterized in that the auxiliary substrate is mechanically connected to the carrier substrate in addition to the two existing electrical connections to the contact point and to the connection point. By means of this connection, which is arranged in the region between the two electrical connection points of the auxiliary substrate to the carrier substrate, and which can be point-shaped or flat, the design forces both substrates to behave similarly when placed under bending strain, and as such prevents a breaking of the bridge and therefore damage to or destruction of the antenna.

The following explains multiple technical solutions for providing this permanent connection between the auxiliary substrate and the carrier substrate.

In a first embodiment, at least one support structure can be provided on the carrier substrate, said support structure being materially connected to the second conductor path. The term "support structure" should be understood to include any structure affixed to the carrier substrate that is suitable for allowing a material connection between the auxiliary substrate and/or the second conductor path on the one hand, and the carrier substrate and/or the first conductor path on the other hand.

For example, the support structure can be a material body which is arranged between two neighboring coil turns, which is produced from the same material as the first conductor path, and which is manufactured along with the first conductor path. If the first conductor path which forms the coil turns is produced by an additive method, the same process can produce said material body. For example, in a printing process using a metallic conducting paste, a material body, i.e. a flat structure, can be printed between two neighboring coil turns using the same metallic conducting paste. In this case, the distance between neighboring coil turns may need to be larger than in conventional designs, in order to provide enough space for the material body. Of course, multiple such material bodies can also be arranged between the electrical connection points of the bridge in order to increase the strength of the permanent connection. The connection between the material body and the second conductor path can be created using known methods, including for example ultrasound welding, gluing with a non-conducting glue, etc., such that a permanent connection is created at the site of the material body.

In a first embodiment, at least one connection element can be arranged between the carrier substrate and the auxiliary substrate, said connection element being materially connected to the carrier substrate and/or the first conductor path on the one hand, and the auxiliary substrate and/or the second conductor path on the other hand. The term "connection element" should be understood to include any structure arranged between the auxiliary substrate and the carrier substrate, wherein said structure is suitable for forming a material connection to the auxiliary substrate and/or the second conductor path on the one hand, and the carrier substrate and/or the first conductor path on the other hand. In other words, said connection element differs from the support structure described above in that the element is not rigidly connected to the carrier substrate, but rather is inserted between the carrier substrate with the first conductor path and the auxiliary substrate with the second conductor path, and then is materially connected to both elements.

The connection element can also be shaped as a point, as in the case of the material body described above. For example, an adhesive can be applied as a point between two neighboring coil turns, then the auxiliary substrate can be place over the carrier substrate, and the first conductor path of the auxiliary substrate can be electrically connected on both ends thereof to the connection point of the first conductor path and to the contact point. In this case, the distance between the neighboring coil turns may need to be larger than in conventional designs, in order to provide enough space for the point-shaped connection element. In the event that neither of the conductor paths is already covered by an insulating layer in some way, a non-conducting adhesive must be used.

As an alternative, the connection element can be designed with a flat shape. The flat connection element is placed between the auxiliary substrate and the carrier substrate, and then the first conductor path of the auxiliary substrate is electrically connected on both ends thereof to the connection point of the first conductor path, and to the contact point. In the event that neither of the conductor paths is already covered by an insulating layer in some way, a non-conducting flat connection element must be used. The flat connection element can be a thermoplastic film, for example.

In a further embodiment, the connection element is only large enough that it electrically insulates the area where the carrier substrate and auxiliary substrate overlap. For example, a plastic film is inserted between the auxiliary substrate and the carrier substrate, and said plastic film has a size which corresponds to that of the auxiliary substrate.

In a further embodiment, the connection element is larger than the carrier substrate, wherein the areas of the connection element which project beyond the carrier substrate are connected to two reinforcement layers in a materially-connected manner, said reinforcement layers covering the carrier structure with the auxiliary structure and the connection element each from a different side. In this embodiment, both ends of the second conductor path are electrically connected to the first end of the first conductor path and to the contact point via a perforation of the connection element. For example, in the case of a transponder card in the form of a credit card, an RFID inlay can be arranged between both outer card layers (the reinforcement layers), said inlay having an antenna and therefore also a carrier substrate which is smaller than the credit card itself. However, if the connection element in this antenna is in the credit card format, and as such projects beyond the carrier substrate, the areas of the connection element which project beyond the carrier substrate can serve at the same time to connect the outer card layers to each other. This can be done for example during a laminating process in which a material connection is made between the connection element and both outer layers of the card.

BRIEF DESCRIPTION OF DRAWING FIGURES

The following explains the RFID transponder according to the invention using embodiments and their corresponding illustrations. The following figures are given:

DETAILED DESCRIPTION

Figure 1:
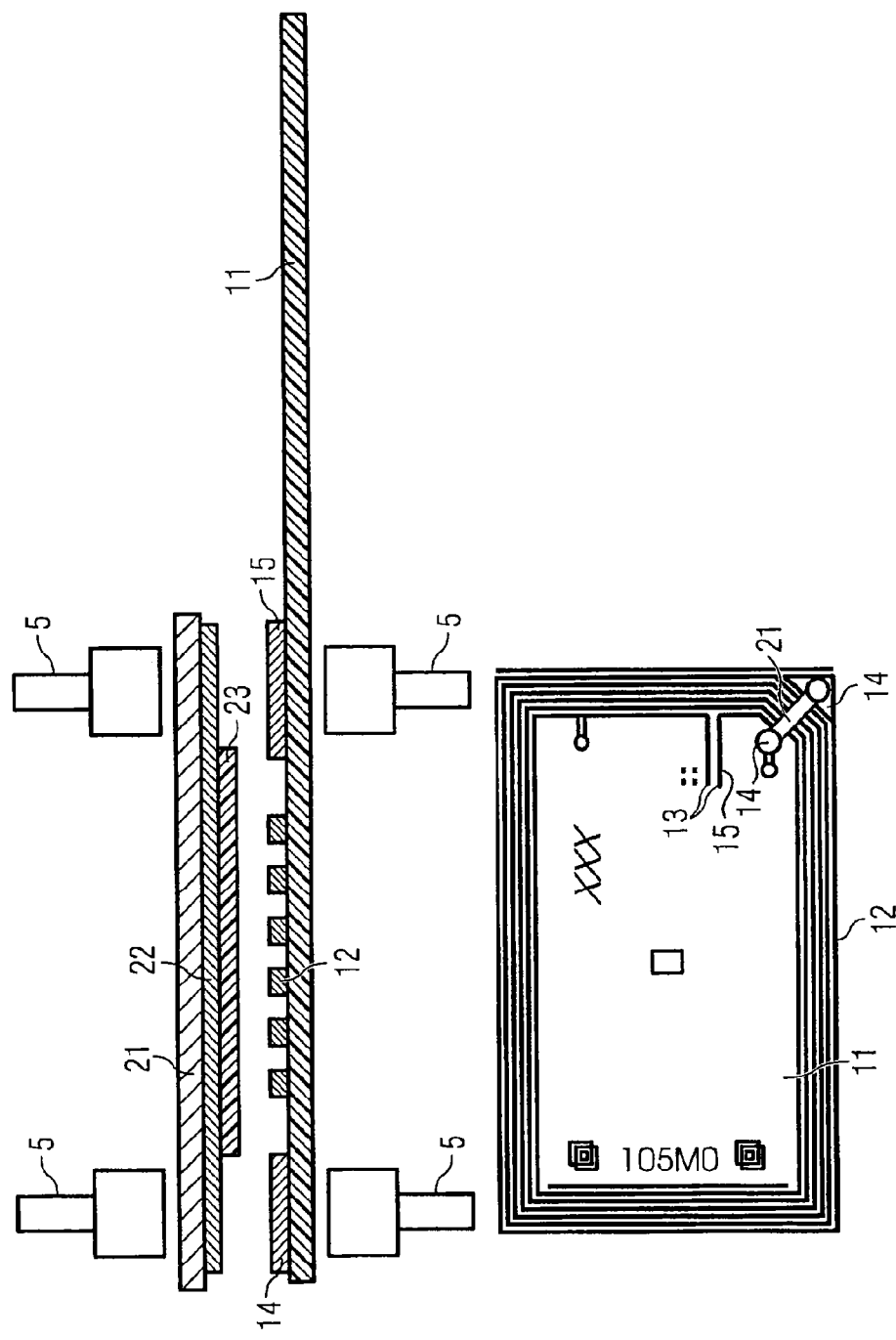
FIG. 1 shows an RFID transponder antenna according to the prior art.

In FIG. 1, a known RFID transponder antenna is shown which has a first conductor path 12 arranged on a carrier substrate 11, said conductor path 12 having a connection point 14 and forming multiple coil turns, and which has a contact point 15 arranged on said carrier substrate 11. One end of the contact point 15 forms a connection point 14, and the other end forms a contact terminal 13 for an integrated circuit. The second conductor path 22 is arranged on an auxiliary substrate 21 and extends between the two connection points 14. The ends of said second conductor path 22 are electrically connected to both connection points 14. In the cross-sectional view, the welding tips 5 of a device for ultrasound welding are portrayed, and these produce the electrical contact at these points. An insulating later 23 is arranged on the second conductor path 22, which itself is arranged on the auxiliary substrate 21. This insulating layer serves to prevent the coil turns of the first conductor path 12 from being shorted by the second conductor path 22.

Figure 2:
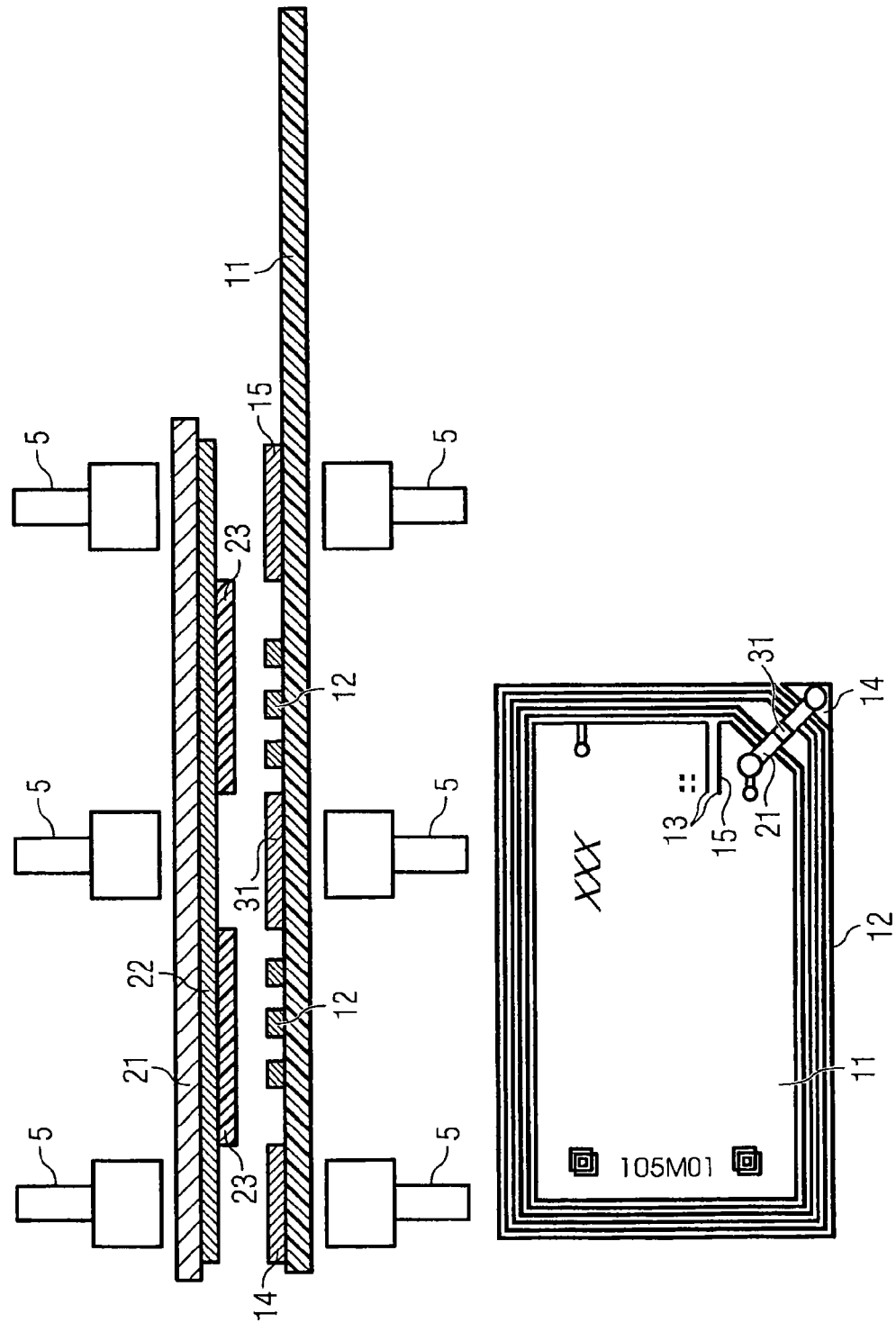
FIG. 2 shows an RFID transponder antenna according to the first embodiment.

In the first embodiment, illustrated in FIG. 2, the distance between two neighboring coil turns is designed to be larger, such that there is space for an additional material connection. To this end, a support structure 31 in the form of a metallic point is arranged between said neighboring coil turns and is connected to the second conductor path 22 by means of ultrasound welding using additional welding tips 5. Because the support structure 31 does not have a connection to the first conductor path 12, and the second conductor path 22 is covered by the insulation layer 23 in the area between the connections to the connection point 14 of the first conductor path 12 and the contact point 15, as well as the support structure 31, no short circuit of the coil turns is possible.

Figure 3:
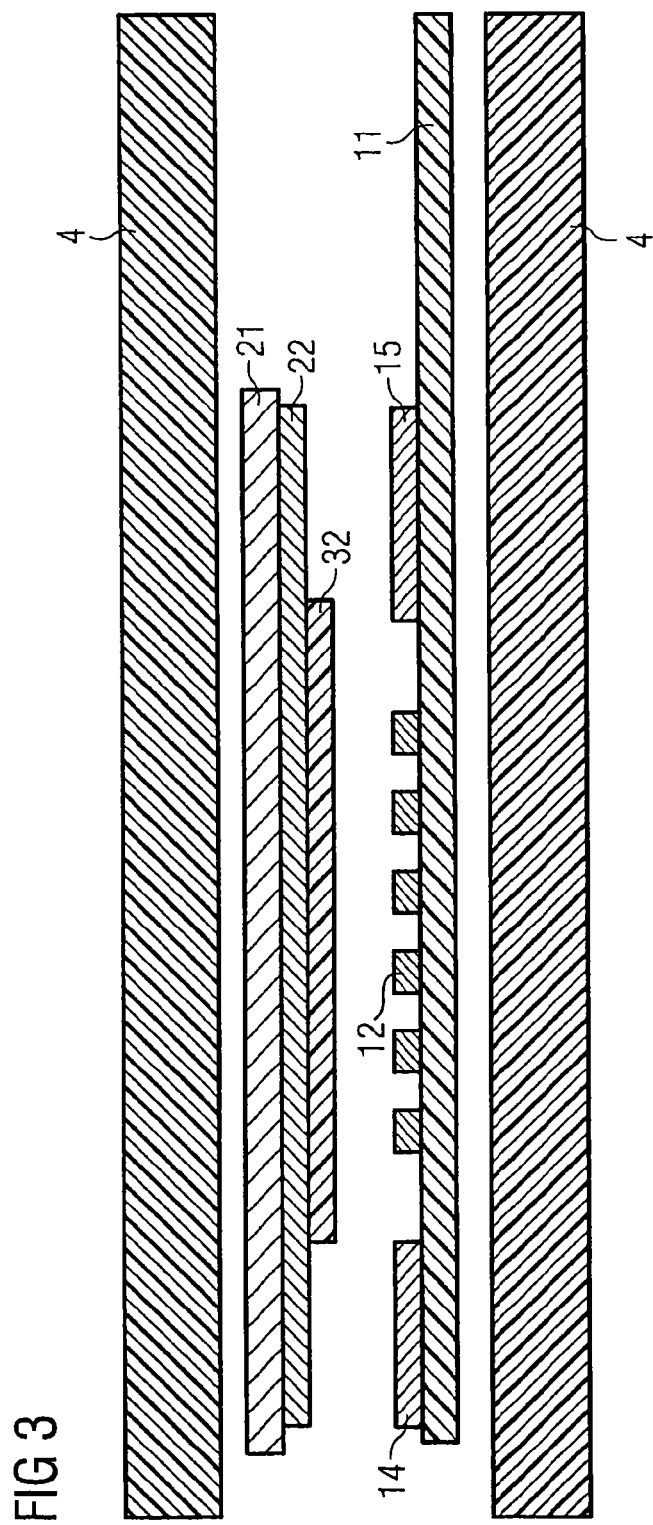
FIG. 3 shows an RFID transponder antenna according to the second embodiment.

In FIG. 3, a second embodiment is illustrated in which the auxiliary substrate 21 and the carrier substrate 11 are both arranged between the two reinforcement layers 4. Said reinforcement layers 4 are provided with an adhesive on the inward facing sides thereof. The electrical contact between the connection point 14 and the contact point 15 with the first conductor path 12 is achieved by the reinforcement layers 4 pressing the carrier substrate 11 and the auxiliary substrate 21 against each other. The additional material connection between the carrier substrate 11 and the auxiliary substrate 21 is produced by the provision of a flat connection element 32 which is applied to the second conductor path 21 in the form of a layer of non-conductive adhesive.

Figure 4:
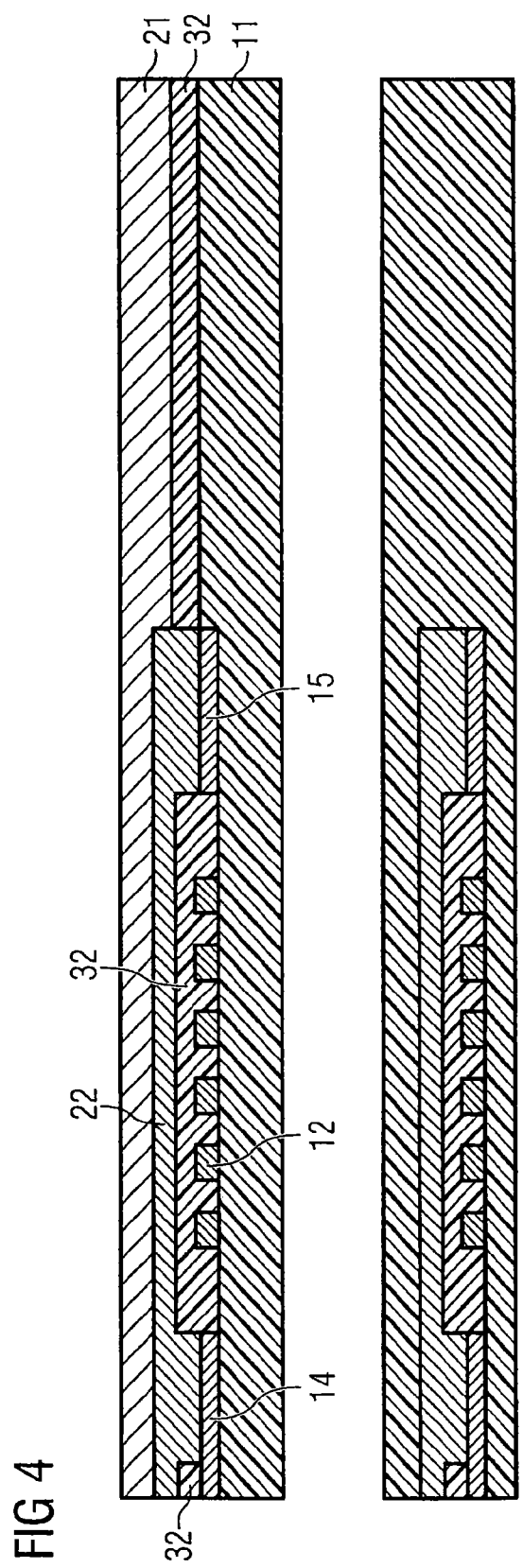
FIG. 4 shows an RFID transponder antenna according to the third embodiment.

The third embodiment, which is illustrated in FIG. 4, shows an RFID transponder antenna. In this example, the auxiliary substrate 21 and the carrier substrate 11 are laminated onto each other by means of heat. In this embodiment, the auxiliary substrate 21 and the carrier substrate 11 are the same size, i.e. the auxiliary substrate 21 completely covers the carrier substrate 11. A flat connection element 32 is arranged between the auxiliary substrate 21 and the carrier substrate 11. In this case, the connection element 32 is a thermoplastic film which is the same size as the auxiliary substrate 21 and the carrier substrate 11, and has recesses in the areas in which an electrical contact is made between the second conductor path 22 and the connection point 14 of the first conductor path 12 and the contact point 15. The lamination results in a material connection between the connection element 14 and the carrier substrate 11, as well as between the connection element 14 and the auxiliary substrate 21. The electrical contact of the connection point 14 and the contact point 15 to the first conductor path 12 is achieved by the laminating process pressing the carrier substrate 11 and the auxiliary substrate 21 together. At the same time, the connection element 32 forms an insulating layer between the first conductor path 12 and the second conductor path 22.

The invention claimed is:

1. An RFID transponder antenna having a carrier substrate and an auxiliary substrate, wherein a first contact point for a first connection to an integrated circuit, and a first conductor path structure which forms at least two neighboring coil turns, each extending fully about a perimeter of the carrier substrate, are arranged on the carrier substrate, a first end of said first conductor path forms a second contact terminal for a second connection to the integrated circuit, an other end of the first conductor path forms a connection point for an electrical connection to a second conductor path arranged on the auxiliary substrate, said second conductor path forming a bridge over the at least two neighboring coil turns, the second conductor path having one end electrically connected to the first contact point, and another end electrically connected to the connection point, wherein the auxiliary substrate is arranged head-down in relation to a surface of the carrier substrate in such a manner that the at least two neighboring coil turns of the carrier substrate are crossed by the auxiliary substrate, and a permanent connection is provided between the auxiliary substrate and/or the second conductor path on one hand, and the carrier substrate and/or the first conductor path on an other hand, said permanent connection being formed at least at one point lying between both ends of the auxiliary substrate, and further comprising at least one support structure arranged on the carrier substrate and materially connected to the second conductor path, the support structure comprising a material body arranged outside of a first and inside of a second of said at least two neighboring coil turns.

2. An RFID transponder antenna according to claim 1, wherein the support structure is produced from a same material as the first conductor path, and manufactured along with the first conductor path at a same time.

3. An RFID transponder antenna having a carrier substrate and an auxiliary substrate, wherein a first contact point for a first connection to an integrated circuit, and a first conductor path structure which forms at least two neighboring coil turns, each extending fully about a perimeter of the carrier substrate, are arranged on the carrier substrate, a first end of said first conductor path forms a second contact terminal for a second connection to the integrated circuit, an other end of the first conductor path forms a connection point for an electrical connection to a second conductor path arranged on the auxiliary substrate, said second conductor path forming a bridge over the at least two neighboring coil turns, the second conductor path having one end electrically connected to the first contact point, and another end electrically connected to the connection point , wherein the auxiliary substrate is arranged head-down in relation to a surface of the carrier substrate in such a manner that the at least two neighboring coil turns of the carrier substrate are crossed by the auxiliary substrate, and a permanent connection is provided between the auxiliary substrate and/or the second conductor path on one hand, and the carrier substrate and/or the first conductor path on an other hand, said permanent connection being formed at least at one point lying between both ends of the auxiliary substrate, further comprising at least one connection element arranged between the carrier substrate and the auxiliary substrate, said at least one connection element being materially connected to the carrier substrate and/or the first conductor path on one hand, and the auxiliary substrate and/or the second conductor path on an other hand.

4. An RFID transponder antenna according to claim 3, wherein the at least one connection element is only large enough to electrically insulate an area where the carrier substrate and auxiliary substrate overlap.

5. An RFID transponder antenna according to claim 3, wherein the at least one connection element is a same size or larger than the carrier substrate, areas of the at least one connection element which project beyond the carrier substrate are connected to two reinforcement layers in a materially-connected manner, said reinforcement layers covering the carrier substrate with the auxiliary substrate and the at least one connection element each from a different side, and both ends of the second conductor path are electrically connected to the first end of the first conductor path and to the first contact point via a perforation of the at least one connection element.

6. An RFID transponder antenna according to claim 3, wherein the at least one connection element comprises a thermoplastic film.

7. An RFID transponder antenna according to claim 3, wherein the at least one connection element comprises a non-conductive adhesive.

\* \* \* \* \*

UNITED STATES PATENT AND TRADEMARK OFFICE
CERTIFICATE OF CORRECTION

| | | |
|---|---|---|
| PATENT NO. | : 8,917,219 B2 | Page 1 of 1 |
| APPLICATION NO. | : 13/120726 | |
| DATED | : December 23, 2014 | |
| INVENTOR(S) | : Semar et al. | |

It is certified that error appears in the above-identified patent and that said Letters Patent is hereby corrected as shown below:

On the Title Page

In the Assignee item (73): Delete "Smartrac Technology Dresden GmbH" and insert -- Smartrac Technology GmbH --

Signed and Sealed this
Fourteenth Day of April, 2015

Michelle K. Lee
*Director of the United States Patent and Trademark Office*